(12) United States Patent
Iwazaki et al.

(10) Patent No.: US 8,150,581 B2
(45) Date of Patent: Apr. 3, 2012

(54) DRIVING ASSISTANCE SYSTEM AND DRIVING ASSISTANCE METHOD

(75) Inventors: Katsuhiko Iwazaki, Numazu (JP); Seiji Kawakami, Susono (JP); Hiroaki Kataoka, Susono (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 975 days.

(21) Appl. No.: 12/085,779

(22) PCT Filed: Nov. 30, 2006

(86) PCT No.: PCT/IB2006/003417
§ 371 (c)(1),
(2), (4) Date: Jun. 2, 2008

(87) PCT Pub. No.: WO2007/063397
PCT Pub. Date: Jun. 7, 2007

(65) Prior Publication Data
US 2009/0048738 A1    Feb. 19, 2009

(30) Foreign Application Priority Data
Dec. 1, 2005 (JP) ................................. 2005-348279

(51) Int. Cl.
*B60W 30/12* (2006.01)
(52) U.S. Cl. ........................................................ 701/42
(58) Field of Classification Search ...................... 701/44
See application file for complete search history.

(56) References Cited

U.S. PATENT DOCUMENTS

| | | | |
|---|---|---|---|
| 6,463,369 B2 * | 10/2002 | Sadano et al. ................. | 701/28 |
| 6,778,890 B2 * | 8/2004 | Shimakage et al. ............ | 701/41 |
| 6,853,906 B1 * | 2/2005 | Michi et al. .................... | 701/207 |
| 6,970,777 B2 * | 11/2005 | Tange et al. ..................... | 701/41 |
| 7,236,884 B2 * | 6/2007 | Matsumoto et al. .......... | 701/300 |
| 7,269,493 B2 * | 9/2007 | Uemura et al. ................. | 701/70 |
| 7,620,497 B2 * | 11/2009 | Maass ............................ | 701/301 |

(Continued)

FOREIGN PATENT DOCUMENTS

EP    1 170 651 A2    1/2002

(Continued)

OTHER PUBLICATIONS

Office Action dated Feb. 1, 2011 issued in Japanese Patent Application No. 2008-542857 (with translation).

*Primary Examiner* — Shelley Chen
(74) *Attorney, Agent, or Firm* — Oliff & Berridge, PLC

(57) ABSTRACT

In a driving assistance system having an actuator (16) for steering steered wheels of a vehicle, a positional deviation detecting unit (9) detects a deviation of a position of the vehicle from a forward travel path of the vehicle based on information around the vehicle. A steering control variable determination unit (2) determines a steering control variable to cancel the deviation. If a vehicle speed detected by a vehicle speed detecting unit is equal to or greater than a predetermined speed, the steering control variable determined by a steering control variable determination unit (2) decreases with an increase of the vehicle speed under the condition that the deviation of the position of the vehicle from the forward travel path is same. The driving assistance system can reduce a driver's discomfort caused by the steering control through the actuator (16) when the vehicle is running at a high speed.

15 Claims, 9 Drawing Sheets

U.S. PATENT DOCUMENTS

| | | | |
|---|---|---|---|
| 2002/0007236 A1* | 1/2002 | Sadano et al. | 701/28 |
| 2002/0007239 A1 | 1/2002 | Matsumoto et al. | |
| 2004/0153228 A1* | 8/2004 | Matsumoto et al. | 701/41 |
| 2004/0186650 A1* | 9/2004 | Tange et al. | 701/96 |
| 2004/0215393 A1* | 10/2004 | Matsumoto et al. | 701/300 |
| 2005/0096828 A1* | 5/2005 | Uemura et al. | 701/70 |
| 2005/0113999 A1* | 5/2005 | Tange et al. | 701/41 |
| 2005/0182539 A1* | 8/2005 | Maass | 701/41 |
| 2005/0267661 A1 | 12/2005 | Iwazaki et al. | |
| 2005/0267684 A1 | 12/2005 | Kawakami et al. | |
| 2005/0270145 A1 | 12/2005 | Kataoka et al. | |
| 2005/0273234 A1 | 12/2005 | Rattapon et al. | |
| 2005/0273261 A1 | 12/2005 | Niwa et al. | |
| 2005/0273262 A1 | 12/2005 | Kawakami et al. | |
| 2005/0278096 A1 | 12/2005 | Iwazaki et al. | |

FOREIGN PATENT DOCUMENTS

| | | |
|---|---|---|
| EP | 1 538 019 A2 | 6/2005 |
| JP | A-05-216535 | 8/1993 |
| JP | A-09-183383 | 7/1997 |
| JP | A-10-119807 | 5/1998 |
| JP | 11147481 A * | 6/1999 |
| JP | A-2001-010518 | 1/2001 |
| JP | A-2003-205847 | 7/2003 |
| JP | A-2003-208225 | 7/2003 |
| JP | A-2005-343300 | 12/2005 |
| JP | A-2006-143096 | 6/2006 |

* cited by examiner

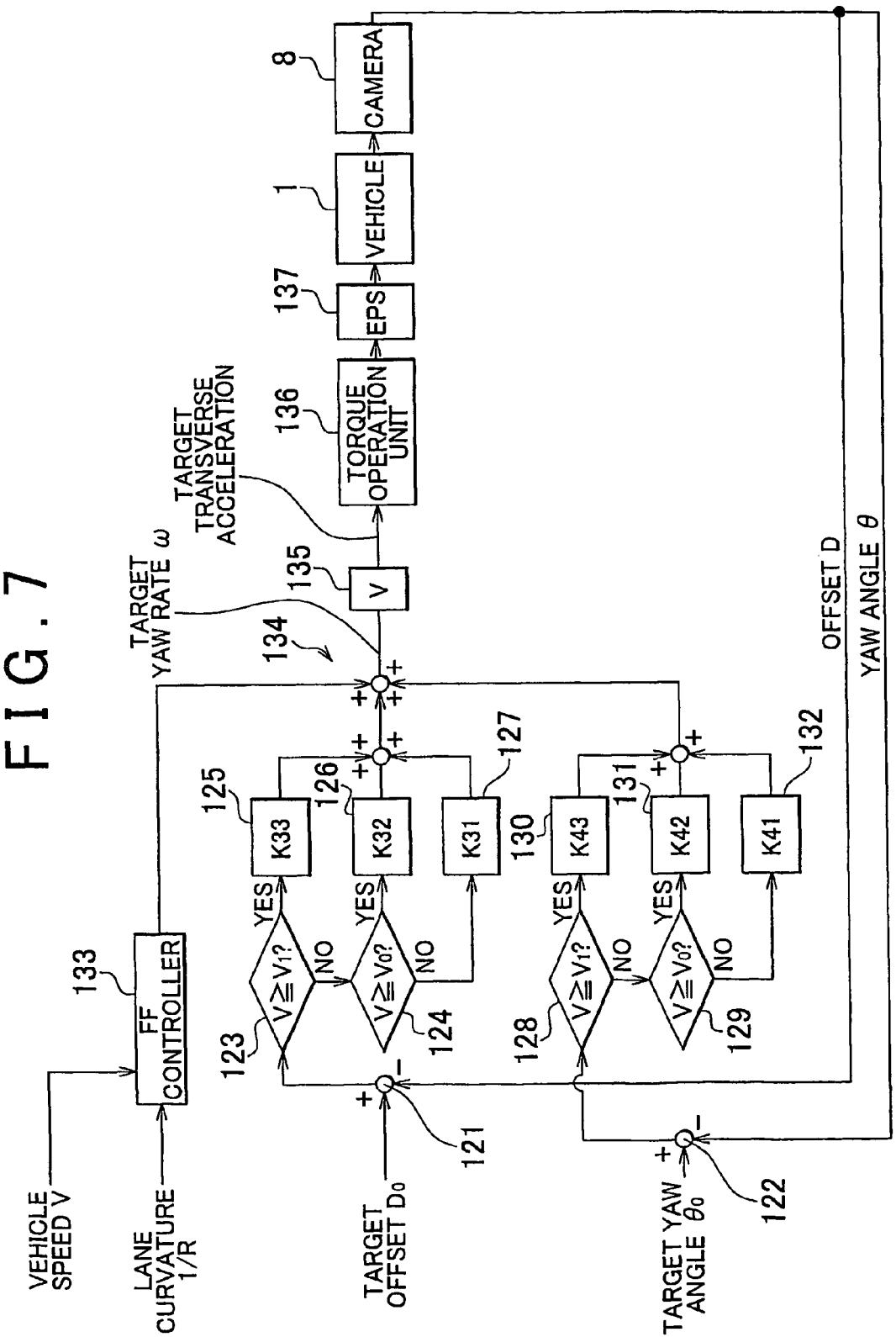

DRIVING ASSISTANCE SYSTEM AND DRIVING ASSISTANCE METHOD

BACKGROUND OF THE INVENTION

1. Field of the Invention

The present invention relates to a driving assistance system that has an actuator for steering the steered wheels of a vehicle by applying a steering torque thereto, to thereby assist the driving of the vehicle.

2. Description of Related Art

Driving assistance systems that assist in preventing a vehicle from running astray from designated travel path using an image or video of the road ahead of the vehicle captured by a camera or the like and detecting the travel path based on the image or video are known. Such driving assistance systems are referred to as lane keeping (assist) systems. There are two types of lane keeping (assist) systems. One type only provides a warning to the driver when the vehicle deviates from its travel path. The second type actively corrects the deviation by steering (or assisting the steering of) the steered wheels by means of an actuator when the vehicle deviates from its travel path. Japanese Patent Application Publication No. JP-A-2001-10518 an example of the second type of system is disclosed in.

The vehicle steering control system disclosed Japanese Patent Application Publication No. JP-A-2001-10518 calculates the curvature of the road ahead of the vehicle, or the offset (an offset distance) and the yaw angle of the vehicle based on an image or video of the area ahead of the vehicle. Then, based on the road curvature, the offset and the yaw angle, the steered wheels are steered appropriately by means of an actuator in such a manner as to prevent the vehicle from deviating from its travel path. The offset is also called a transverse deviation and represents the deviation of the vehicle with respect to the travel path in a transverse direction thereof. The offset can be calculated based on an appropriate reference such as the longitudinal axis of the vehicle and/or the centerline of the lane in which the vehicle is traveling. The yaw angle is also called a heading angle and represents the vehicle's traveling direction with respect to the travel path.

In the vehicle steering control system disclosed in Japanese Patent Application Publication No. JP-A-2001-10518, however, the same steering control is applied regardless of the speed of the vehicle because the controller of the system is designed without taking variations of vehicle characteristics depending on the vehicle speed into consideration. In fact, when a vehicle is running at a high speed, a driver tends to grab the steering wheel firmly. In this situation, if the steered wheels are steered by employing the above-described steering control, a reaction force resulting from the steering action would be delivered to the driver, causing the driver to feel uncomfortable even if the reaction force is very small.

SUMMARY OF THE INVENTION

The present invention provides a driving assistance system and a driving assistance method that can reduce a driver's discomfort caused by the steering control through the actuator when a vehicle is running at a high speed.

In a first aspect of the present invention, a driving assistance system, which includes an actuator for steering the steered wheels of the vehicle to assist the steering operation of the vehicle. In addition, the driving assistance system includes: a vehicle speed detecting unit for detecting the speed of the vehicle; an information acquiring unit for acquiring information around the vehicle; a positional deviation detecting unit for detecting deviations of the position of the vehicle from the forward travel path of the vehicle based on the information obtained by the information acquiring unit; a steering control variable determination unit that determines the steering control variable needed to cancel the deviation of the position of the vehicle from the forward travel path of the vehicle; and a steering control unit that controls the actuator based on the steering control variable, wherein, if the vehicle speed detected by the vehicle speed detecting unit is equal to or greater than a first threshold speed, as the vehicle speed increases the steering control variable decreases for a given deviation of the vehicle position from the forward travel path.

In accordance with the driving assistance system, if the vehicle speed detected by the vehicle speed detecting unit is equal to or greater than the threshold speed, the steering control variable is determined such that the steering amount generated by the actuator decreases with an increase of the vehicle speed. In this way, the reaction force resulting from the steering action of the steered wheels that is delivered to the driver can be reduced as the vehicle speed increases. Accordingly, it is possible to reduce the discomfort that the driver might feel while the vehicle is traveling at a high speed.

The steering control variable may be a control variable for the steering torque applied to the steered wheels.

As such, by using a steering torque control variable as the steering control variable to control the steering torque applied by the actuator to the steered wheels, the steering control variable can be readily controlled.

The steering control variable determination unit may include a target transverse acceleration determination unit that calculates a target transverse acceleration of the vehicle for correcting the deviation of the position of the vehicle from the forward travel path, and the steering control variable determination unit determines the steering control variable based on the target transverse acceleration calculated.

Further, the deviation of the vehicle position from the forward travel path may be a positional displacement of the vehicle with respect to the forward travel path in a transverse direction thereof or an angular displacement of the vehicle with respect to the forward travel path. Alternatively, the deviation of the position of the vehicle from the forward travel path may be a deviation therebetween at a focus point distance. Here, the focus point distance means a distance between the vehicle and a position where the driver is focusing, and a distance between the vehicle and a reference position for obtaining a positional displacement of the vehicle after traveling a predetermined distance.

Moreover, the steering control variable determination unit determines the steering control variable based on the value obtained by multiplying a control gain by the deviation of the vehicle position from the forward travel path. In particular, if the vehicle speed detected by the vehicle speed detecting unit is equal to or greater than the threshold speed, as the vehicle speed increases the control gain decreases for a given deviation of the position of the vehicle from the forward travel path.

As such, by decreasing the control gain with an increase of the vehicle, the steering control variable can be readily obtained.

Furthermore, the steering control variable determination unit may include a target yaw rate determination unit that calculates a target yaw rate of the vehicle that would be appropriate for correcting the deviation of the vehicle position from the forward travel path, and the steering control variable determination unit determines the steering control variable based on the target yaw rate. In this way, the steering control variable may be determined based on the target yaw rate.

In accordance with the driving assistance system of the invention, it is possible to reduce the driver's discomfort caused by the steering control by the actuator when a vehicle is running at a high speed.

In a second aspect of the present invention, a driving assistance method assists the steering operation of the vehicle by controlling an actuator for steering the steered wheels of the vehicle. The driving assistance method includes: detecting the speed of the vehicle; acquiring information around the vehicle; detecting deviations of the position of the vehicle from the forward travel path of the vehicle; determines the steering control variable needed to cancel the deviation of the position of the vehicle from the forward travel path of the vehicle; and controlling the actuator based on the steering control variable. In the driving assistance method, if the vehicle speed detected by the vehicle speed detecting unit is equal to or greater than a first threshold speed, as the vehicle speed increases the steering control variable decreases for a given deviation of the vehicle position from the forward travel path.

BRIEF DESCRIPTION OF THE DRAWINGS

The above and other objects and features of the present invention will become apparent from the following description of preferred embodiments given in conjunction with the accompanying drawings, in which:

FIG. 7 offers a view to describe a process for calculating a target transverse acceleration through two steps of calculating a target yaw rate from a target offset distance and a target yaw angle and then calculating the target transverse acceleration from the target yaw rate;

DETAILED DESCRIPTION OF THE PREFERRED EMBODIMENTS

Figure 1:
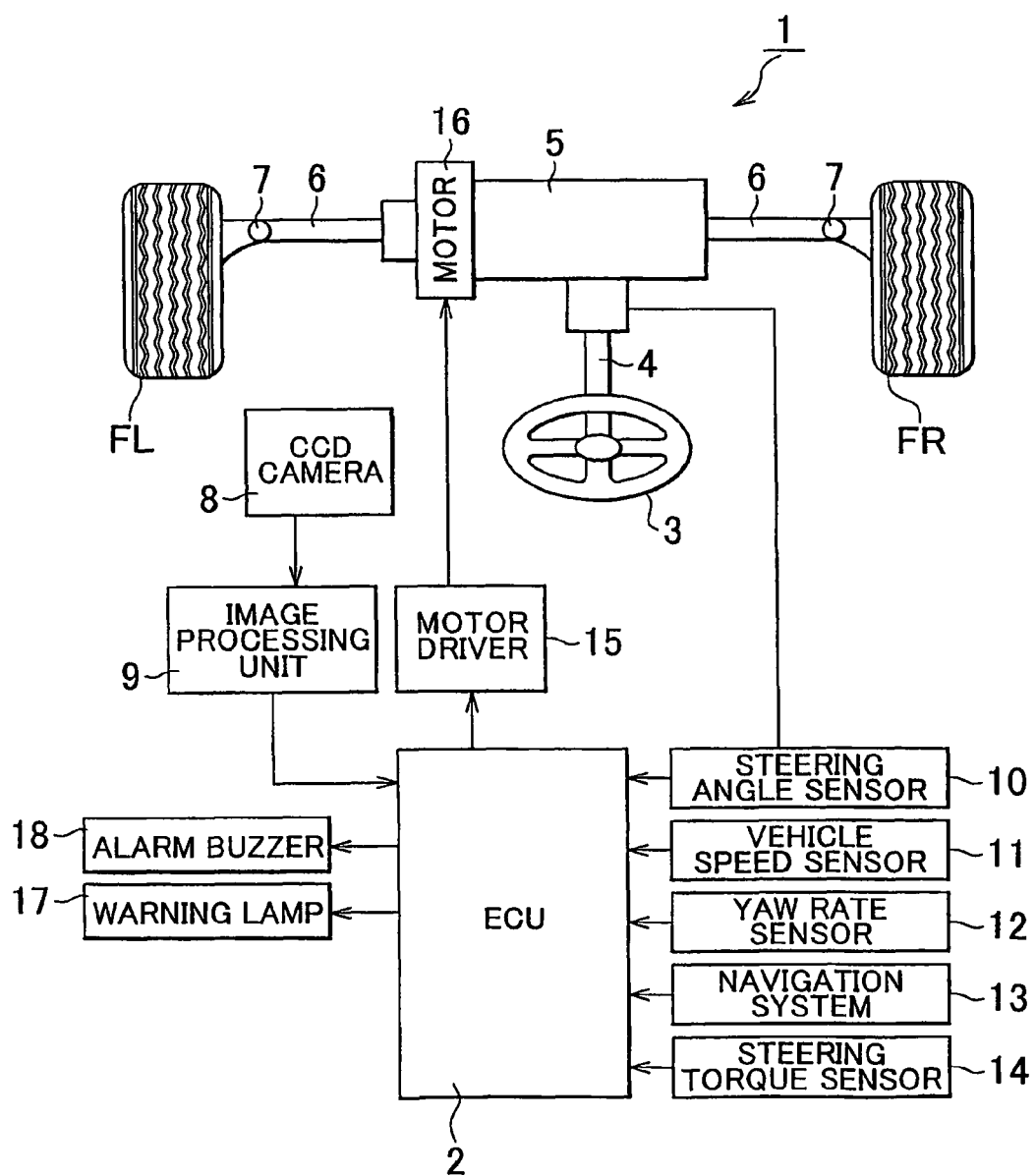
FIG. 1 is a block diagram of a driving assistance system in accordance with the present invention.

Hereinafter, preferred embodiments of the present invention will be described in detail with reference to the accompanying drawings, in which like reference numerals designate like parts in the drawings, and redundant descriptions thereon will be omitted.

As shown in FIG. 1, the driving assistance system installed in the vehicle 1 includes an ECU (Electronic Control Unit) 2 that performs a driving assistance control (lane keeping control). As shown in FIG. 1, the vehicle 1 has a steering wheel 3 installed in the interior of the vehicle 1. A driver manipulates the steering wheel 3 to steer the steered wheels (here, left and right front wheels FL and FR). The steering wheel 3 is fixed at one end of a steering shaft 4, so that the steering shaft 4 rotates when the steering wheel 3 is turned.

A rack bar 6 is connected to the other end of the steering shaft 4 via a steering gear box 5. The steering gear box 5 converts the rotational motion of the steering shaft 4 into linear motion of the rack bar 6 in its axial direction. Both ends of the rack bar 6 are connected to hub carriers of the front wheels FL and FR via knuckle arms 7, respectively. With this configuration, when the steering wheel 3 is rotated, the front wheels FL and FR would be steered via the steering shaft 4 and the steering gear box 5 (rack bar 6).

Figure 2:
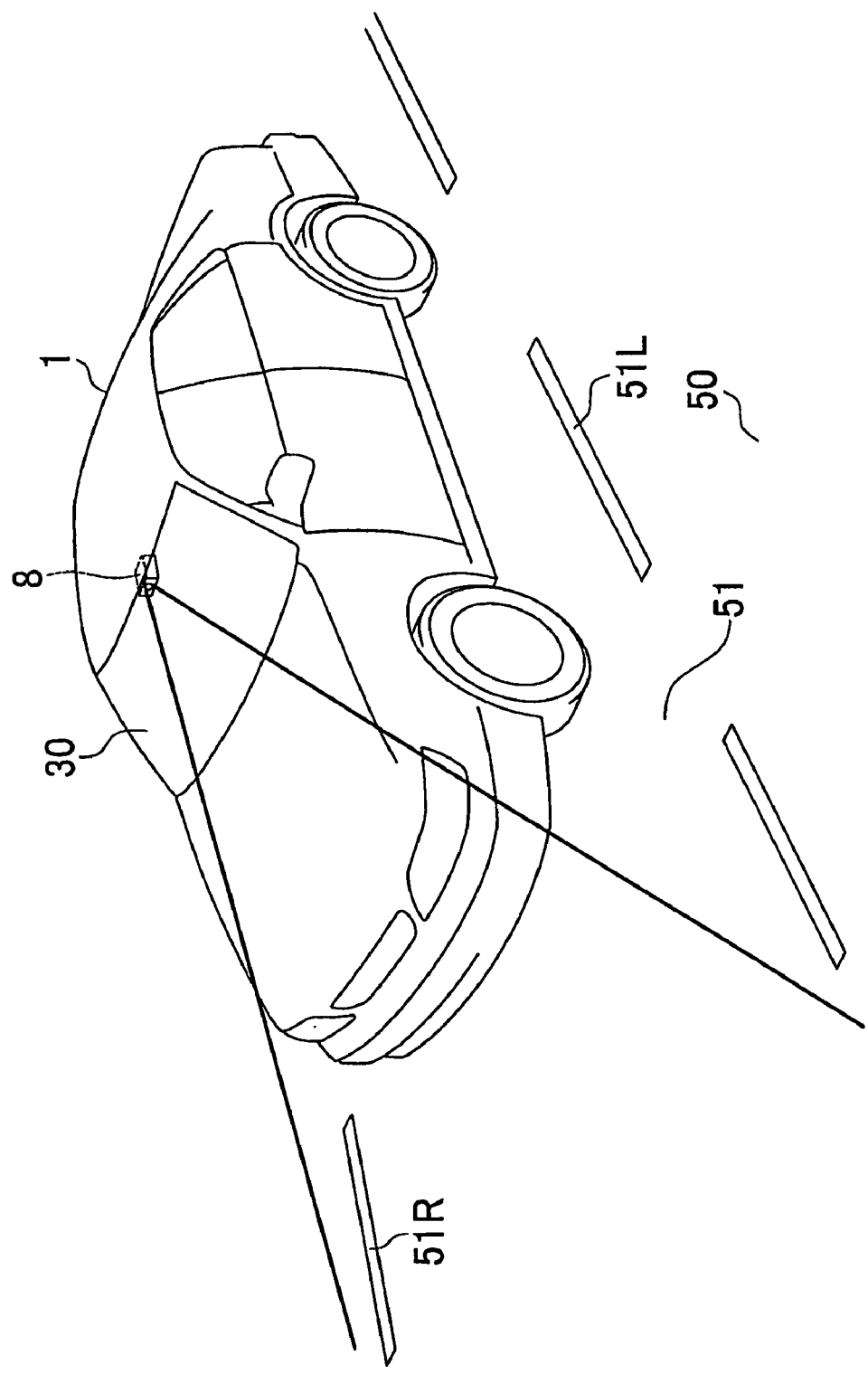
FIG. 2 sets forth a view to describe how to acquire image data of a lane ahead of a vehicle by means of an image sensor mounted on the vehicle.

Further, as shown in FIG. 2, installed in the rearview mirror of the vehicle 1 is a charge-coupled device (CCD) camera 8, which serves as an information acquiring unit, for capturing an image of the area ahead of the vehicle 1. The CCD camera 8 captures images of the area ahead of the vehicle 1 within a forward region over a front window 30 of the vehicle 1, thereby obtaining images of the area ahead of the vehicle 1 as surrounding information data for the vehicle 1. Specifically, the camera 8 takes a moving picture around a lane 51 of the road 50 on which the vehicle 1 is traveling.

The CCD camera 8 is connected to an image processing unit 9, and the image data obtained by the CCD camera 8 is output to the image processing unit 9. The image processing unit 9 processes the image data provided from the CCD camera 8 and detects the lane (travel path) 51 ahead of the vehicle 1 based on, e.g., lane-dividing lines (white lines) drawn on the road 50. In the image or video taken by the camera 8, since the difference in brightness between the road surface and the white lines thereon is significant, detection of the white lines is relatively easy, which in turn allows for an easy detection of the lane 51 ahead of the vehicle 1.

The image-processing unit 9 is connected to the ECU 2. Based on the lane 51 detected through the image processing of the image data, the image-processing unit 9 calculates the curvature 1/R of the forward travel path, and the offset distance D and the yaw angle θ of the vehicle 1 with respect to the lane 51. The offset distance D of the vehicle 1 corresponds to the positional displacement of the vehicle 1 with respect to the travel path in the transverse direction of the vehicle 1.

Figure 3:
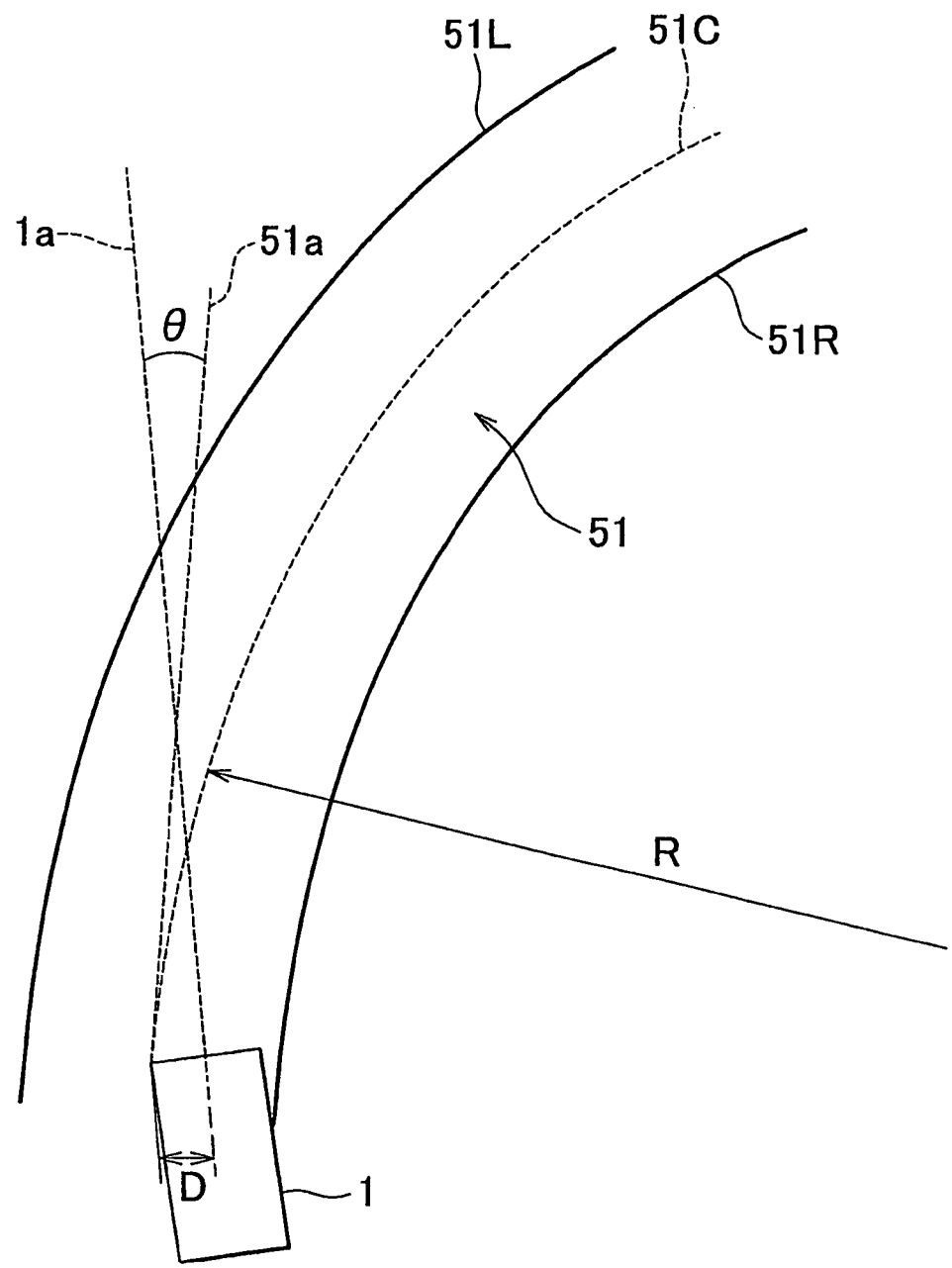
FIG. 3 presents a view to describe various road parameters and travel parameters concerned when a vehicle is traveling on the lane.

Based on the detected lane 51, the image processing unit 9 calculates the curvature ($\chi=1/R$) of the forward travel path and/or the offset distance D and the yaw angle θ of the vehicle 1 with respect to the lane 51 as shown in FIG. 3. Here, the offset distance D corresponds to the lateral deviation between the longitudinal central axis $1a$ of the vehicle 1 and a tangential line $51a$ of the lane central line $51c$ drawn between the right line 51R and the left line 51L of the lane 51 at the centroid position of the vehicle 1. Further, the yaw angle θ corresponds to an angle (gradient) formed by the central axis $1a$ and the tangential line $51a$ of the lane central line 51C at the centroid position of the vehicle 1.

The image-processing unit 9 outputs the curvature 1/R of the forward travel path as well as the offset distance D and the yaw angle θ of the vehicle 1 to the ECU 2. Calculation of the various parameters of the forward travel path (such as the lane curvature 1/R, the offset distance D and the yaw angle θ) from the image may be carried out using methods known in the art. Here, the CCD camera 8 serves as an imaging unit, while the image-processing unit 9 functions as a positional deviation detecting unit. Alternatively, the image-processing unit 9 may output the image to the ECU 2 after partial processing, and the ECU 2 may calculate the lane curvature 1/R, the offset distance D and the yaw angle $\theta$ instead. In such a case, the ECU 2 serves as a positional-deviation detecting unit.

Further, a steering angle sensor 10 and vehicle speed sensors 11 are also connected to the ECU 2. The steering angle sensor 10 outputs a signal in accordance with a steering angle of the steering wheel 3. The vehicle speed sensors 11 are configured as wheel speed sensors, attached to the respective wheels of the vehicle, that generate pulse signals in a period depending on a vehicle speed. That is, the vehicle speed sensors 11 serve as a vehicle speed detecting unit. It is also possible to install an acceleration sensor that detects the longitudinal acceleration of the vehicle as the vehicle speed detecting unit, in which case the vehicle speed is detected by integrating the output from the acceleration sensor over time. The output signals from the steering angle sensor 10 and the vehicle speed sensors 11 are sent to the ECU 2, and the ECU 2 detects the steering angle and the vehicle speed based on the received signals.

Also, a yaw rate sensor 12, a navigation system 13 and a steering torque sensor 14 are connected to the ECU 2. The yaw rate sensor 12 is disposed near the centroid of the vehicle 1 to detect a yaw rate with respect to the median vertical axis and send the result to the ECU 2. Further, the navigation system 13 is an apparatus that detects the current location of the vehicle 1 by using a global positioning system (GPS), and the like. The navigation system 13 also detects the curvature 1/R or gradient of the road ahead of the vehicle 1. The ECU 2 determines the current location of the vehicle 1 and conditions of the road on which the vehicle 1 will travel. The steering torque sensor 14 is attached to the steering shaft 4, and detects a steering torque when the driver manipulates the steering wheel 3. The steering torque thus detected is sent to the ECU 2.

In addition, a motor driver 15 is also connected to the ECU 2, and a motor (actuator) 16 that is disposed in the steering gear box 5 is connected to the motor driver 15. Though not shown, the rack bar 6 is provided with a ball screw groove partially formed in the outer peripheral surface thereof, and a ball nut having at its inner peripheral surface a ball screw groove corresponding to the ball screw groove of the rack bar 6 is fixed at a rotor of the motor 16. A plurality of bearing balls is accommodated between the pair of ball screw grooves, and the rotor is rotated when the motor 16 is driven, thereby assisting the linear motion of the rack bar 6 in its axial direction, i.e., a steering operation. The motor driver 15 serves as a steering control unit and the ECU 2 functions as a steering control variable determination unit as well as a target transverse acceleration determination unit in the present invention.

The motor driver 15 supplies a driving current to the motor 16 in response to a command signal from the ECU 2. Then, the motor 16 applies a steering torque to the rack bar 6, the steering torque being a steering control variable depending on the driving current from the motor driver 15. That is, by providing the command signal to the motor driver 15 to actuate the motor 16 in compliance with a logic to be described later, the ECU 2 directs the displacement of the rack bar 6 to steer the wheels FL and FR.

Moreover, a warning lamp 17 and an alarm buzzer 18 are also connected to the ECU 2. The warning lamp 17 is disposed in the interior of the vehicle at a position where it can be readily viewed by the driver or a passenger. The warning lamp 17 turns on in response to a command signal from the ECU 2. Further, the alarm buzzer 18 produces a warning sound in the interior of the vehicle 1 in compliance with a command signal from the ECU 2. By actuating the warning lamp 17 and the alarm buzzer 18 in accordance with a logic to be described later, the ECU 2 alerts the driver audibly and visibly.

The lane keeping control (driving assistance control) mechanism will now be described briefly. The scheme of the lane keeping control will be first explained. In the lane keeping control, the transverse acceleration necessary to drive the vehicle 1 along the curve of a travel lane ahead of the vehicle 1 is calculated based on the curvature 1/R of the forward lane and the vehicle speed V. Further, a transverse acceleration required to correct a current offset distance D to a target offset distance D0 is also calculated, wherein the current offset distance D represents the deviation of the vehicle 1 from the expected travel path of the vehicle 1. A transverse acceleration that is required to correct the yaw angle $\theta$ of the vehicle 1 to a target yaw angle $\theta 0$ is also calculated. Then, a target transverse acceleration is obtained by adding up these transverse accelerations. By generating the target transverse acceleration to the vehicle 1, the vehicle 1 is made to run along the curve of the forward lane, while reducing the offset distance D by adjusting the current offset distance D and the current yaw angle $\theta$ to the target offset distance D0 and the target yaw angle $\theta 0$, respectively.

Subsequently, the lane keeping control mechanism will be explained in further detail. First, the lane of a road is detected based on image data obtained by the CCD camera 8. Then, the motor 16 is driven to steer the wheels FL and FR so that the vehicle 1 travels along the detected lane. To be more specific, the positional relationship between the lane detected from the image data of the CCD camera 8 and the current position of the vehicle 1 is determined, wherein the relationship can be obtained based on the lane curvature 1/R, the offset distance D, the yaw angle $\theta$, and the like, as described above.

Then, a control variable for moving the vehicle 1 (i.e., a target transverse acceleration serving as a control variable of the motor 16 (steering torque variable)), which is required to establish a predetermined target positional relationship (a positional relationship for allowing the vehicle 1 to travel along a forward travel path), is calculated. Thereafter, based on the calculated control variable, the motor 16 is driven to apply a steering torque to the rack bar 6, thereby steering the wheels FL and FR. By virtue of the steering operation, it is possible to drive the vehicle 1 along the travel lane without the driver having to manipulate the steering wheel 3 or by assisting the driver's manipulation of the steering wheel 3.

Hereinafter, there will be described a sequence for calculating the target transverse acceleration directly from the target offset distance and the target yaw angle in the driving assistance system in accordance with a first embodiment of the present invention, wherein the description will be provided for the case of setting both the target offset distance D0 and the target yaw angle $\theta 0$ to have a value of 0, while assuming that the vehicle 1 is running on a straight road.

Figure 4:
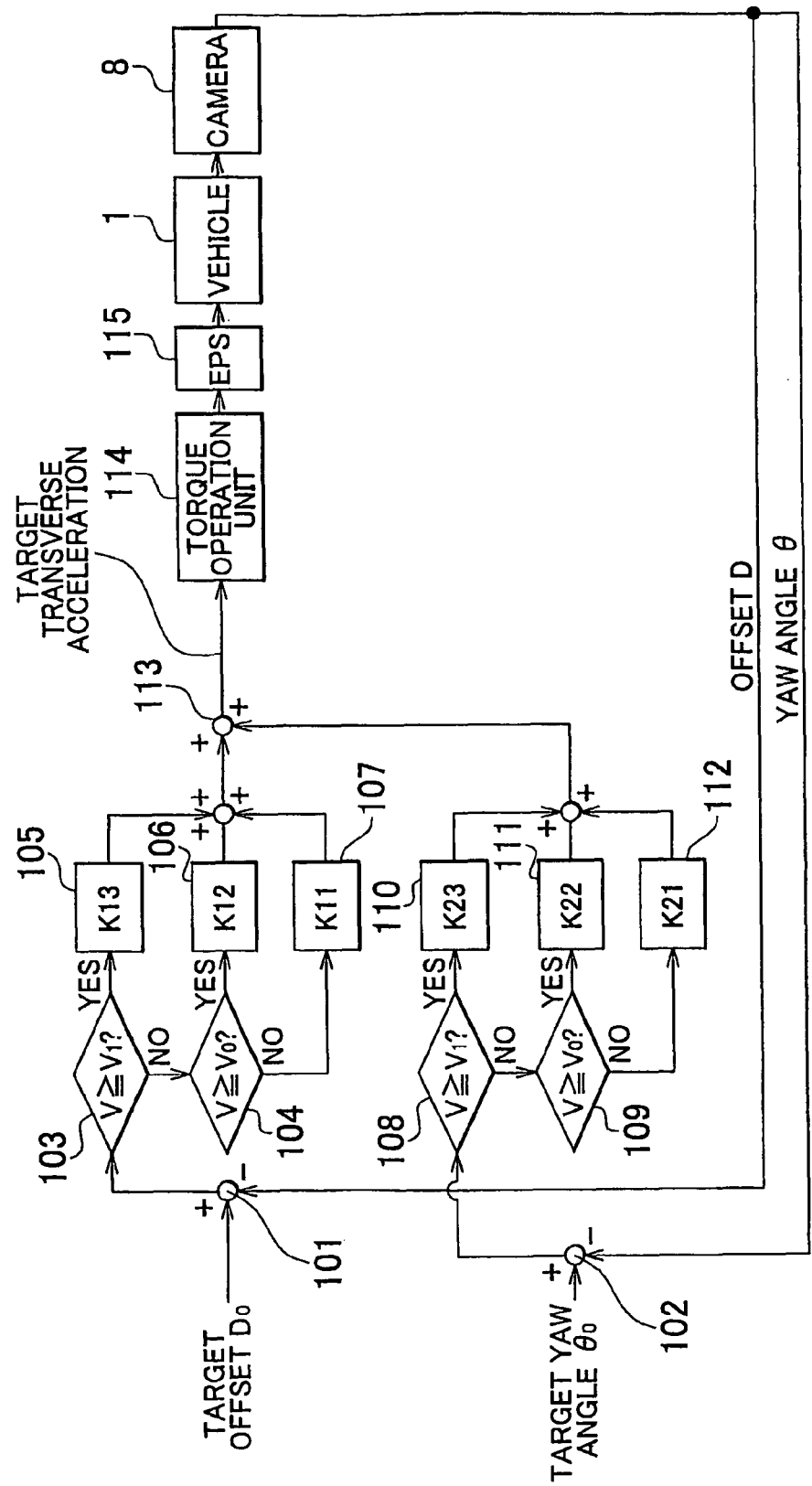
FIG. 4 describes a process for calculating a target transverse acceleration directly from a target offset distance and a target yaw angle.

FIG. 4 explains the sequence of calculating the target transverse acceleration directly from the target offset distance and the target yaw angle in the driving assistance system in accordance with the first embodiment of the present invention.

As shown in FIG. 4, to calculate the target transverse acceleration directly from the offset distance and the yaw angle, the current offset distance D and the current yaw angle $\theta$ of the vehicle 1 are first determined. For the purpose thereof, the image of an area ahead of the vehicle 1 is captured by the CCD camera 8, and, based on the image data, the curvature 1/R of the forward lane, the offset distance D and the yaw angle $\theta$ of the vehicle 1 are calculated by the image processing unit 9 or the ECU 2 as information of a forward travel path. Further, the lane curvature 1/R can be obtained by geometrically calculating a turning radius R of the forward lane and then taking the reciprocal thereof.

The target offset distance D0 and the target yaw angle θ0 are determined in advance. The current offset distance D and the current yaw angle θ are obtained from the image captured as described above. A first operation unit 101 calculates the deviation of the current offset distance D of the vehicle 1 from the target offset distance D0 (which is equivalent to the offset distance D in this embodiment), while a second operation unit 102 calculates the deviation of the current yaw angle θ from the target yaw angle θ0 (which is equivalent to the yaw angle θ in this embodiment), Next, the control gains for calculating the transverse acceleration required to compensate for the offset distance D (i.e., to get the offset distance D to approach the target offset distance D0) will be described. The transverse acceleration that compensates for the offset distance D is obtained by multiplying a gain coefficient by the offset distance deviation (D0−D) of the offset distance D from the target offset distance D0. Here, a first determination unit 103 determines whether or not the vehicle speed V is equal to or greater than a predetermined first speed V1, and if so (V1≦V), the multiplication is carried out in a first multiplication unit 105 using a gain coefficient K13, which decreases as the vehicle speed V increases, for a given offset distance D. Here, the first speed V1 can be set to a value within a range of, e.g., from about 120 to 150 km/h, a high speed range at which the vehicle 1 may be expected to travel on an expressway.

Meanwhile, if the vehicle speed V is below the first speed V1, a second determination unit 104 determines whether the vehicle speed V is equal to or greater than a predetermined second speed V0, which is lower than the first speed V1. If the vehicle speed V is equal to or above the second speed V0 (V0≦V<V1), the multiplication is carried out in a second multiplication unit 106 by using a gain coefficient K12 for keeping the target transverse acceleration constant regardless of fluctuations in the vehicle speed V. Further, if the vehicle speed V is below the second speed V0 (V<V0), the multiplication is carried out in a third multiplication unit 107 by using a gain coefficient K11, which increases as the vehicle speed V increases for a given offset distance D. Here, the second speed V0 is set to a value within a range of, e.g., from about 50 to 80 km/h, which is a lower speed limit on the expressway.

Next, the transverse acceleration required to compensate for the yaw angle θ (i.e., to make the yaw angle θ approach the target yaw angle θ0) will be described. A target transverse acceleration that compensates for the yaw angle θ is obtained by multiplying the deviation (θ0−θ) of the yaw angle θ from the target yaw angle θ0 by a gain coefficient. Here, a third determination unit 108 determines whether the vehicle speed V is equal to or greater than the first speed V1, and if so (V1≦V), the multiplication is done in a fourth multiplication unit 110 using a gain coefficient K23 that decreases as the vehicle speed V increases for a given offset distance D. On the other hand, if the vehicle speed V is below the first speed V1 it is determined in the fourth determination unit 109 whether the vehicle speed V is at or above the second speed V0, which is lower than the first speed V1, and if so (V0≦V<V1), the multiplication is carried out in a fifth multiplication unit 111 using a gain coefficient K22 that maintains a constant target transverse acceleration, regardless of the vehicle speed V. However, if the vehicle speed is below the second speed V0 (V<V0), the multiplication is done in a sixth multiplication unit 112 using a gain coefficient K21 that increases as the vehicle speed V increases for a given offset distance D.

After the control gain is determined through the above-described process, the operation unit 113 calculates the target transverse acceleration in the following sequence by using the control gain and the vehicle speed V required to compensate for the offset distance D and the yaw angle θ.

Here, when the vehicle speed V is less than the second speed V0 (V<V0), the target transverse acceleration can be obtained from equation (1) as follows.

$$\text{Target transverse acceleration} = K1 \times (\text{offset distance}) + K2 \times (\text{yaw angle}) \quad (1)$$

where, K11=K1·V,
K12=K2·V,
K1 and K2 are coefficients which do not depend on the vehicle speed V.

Further, when the vehicle speed V is at least the second speed V0 but below the first speed V1 (V0≦V<V1), the target transverse acceleration can be obtained from equation (2) as follows.

$$\text{Target transverse acceleration} = K12 \times (\text{offset distance}) + K22 \times (\text{yaw angle}) \quad (2)$$

where, K12=K11·V0/V=K1·V0,
K22=K21·V0/V=K2·V0.

Further, when the vehicle speed V is equal to or greater than the first speed V1 (V1≦V), the target transverse acceleration can be obtained from equation (3) as follows.

$$\text{Target transverse acceleration} = K13 \times (\text{offset distance}) + K23 \times (\text{yaw angle}) \quad (3)$$

where, K13=K12·V1/V=K1·V0·V1/V,
K23=K22·V1/V=K2·V0·V1/V.

After the target transverse acceleration is obtained, a torque operation unit 114 calculates the steering amount (a driving torque of the motor 16) required to generate the target transverse acceleration.

Subsequently, an electronic control power steering (EPS) 115, i.e., the motor 16 is driven to generate the calculated driving torque, whereby the left and the right front wheels FL and FR are steered, to keep the vehicle running within the lane. If the vehicle 1 turns, another image of the area ahead of the vehicle 1 is captured by the CCD camera 8, and the above-described control process is repeated.

Figure 5:
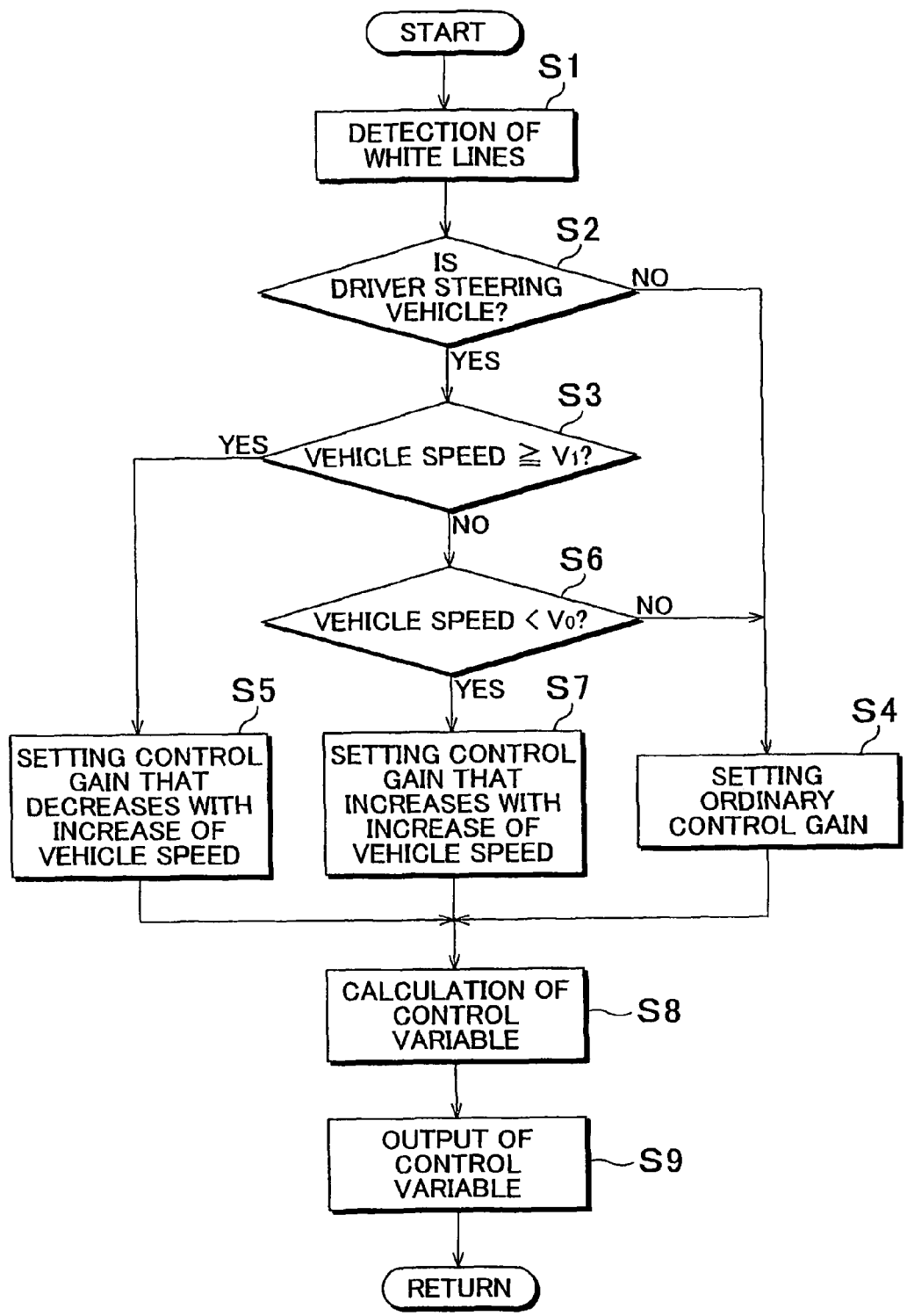
FIG. 5 offers a flowchart to describe a control sequence of the driving assistance system in accordance with the present invention.

Subsequently, a control sequence of the driving assistance system in accordance with the first embodiment will be explained below. FIG. 5 is a flowchart describing the control sequence of the driving assistance system.

As shown in FIG. 5, the first step in the control process of the driving assistance system is the detection of the white lines (S1). The white lines are detected by the image processing unit 9 from the image of the surrounding area ahead of the vehicle 1 captured by the CCD camera 8. Then, based on the thus detected data of the white lines, the current positional relationship between the vehicle 1 and the lane on the road is determined. The positional relationship can be obtained by using the lane curvature 1/R, the offset distance D and the yaw angle θ, as described above.

Then, it is determined whether or not a driver is steering the vehicle 1 based on the steering torque detected by the steering torque sensor 14 or based on an image of driver's movement captured by a CCD camera (not shown) (S2).

As a result, if it is determined that the driver is not steering the vehicle 1, ordinary control gains are selected (S4). For example, the control gain K12 is selected for the offset distance D while the control gain K22 is selected for the yaw angle θ, wherein the control gains K12 and K22 are values at which the target transverse acceleration can be kept constant for a given offset distance D, regardless of the vehicle speed. Here, because the driver would feel no reaction force caused through the steering action when the driver is not steering the vehicle 1, the ordinary control gains are selected. Alternatively, without the step S2, it is possible to set various control gains even when the driver is not steering the vehicle 1. Also, it is possible to select control gains that are no greater than the ordinary control gains when the driver is not steering the vehicle 1.

However, if it is determined in step S2 that the driver is steering the vehicle, it is then determined whether the current vehicle speed V is equal to or greater than the predetermined first speed V1 (S3). If the current vehicle speed V is found to be at or above the first speed V1, the control gains for a given offset distance D that decrease as the vehicle speed V increases are selected (S5). Specifically, the control gain K13 (=K12·V1/V) and the control gain K23 (=K22·V1/V) are set for the offset distance and the yaw angle, respectively. As described above, by selecting control gains for a given offset distance D that decrease with increases in the vehicle speed V, the reaction force of the steering torque is reduced when the vehicle 1 travels at a high speed, thus reducing the discomfort that the driver might feel.

Meanwhile, if the vehicle speed V is below the first speed V1, it is determined whether or not the vehicle speed V is lower than the second speed V0 (S6). If the vehicle speed V is lower than the second speed V0, the control gains that increase, in comparison with the ordinary control gains, with the increase of the vehicle speed for a given offset distance (S7) are selected. Specifically, the control gain K11 (=K1·V) and the control gain K21 (=K2·V) are set up for the offset distance D and the yaw angle θ, respectively. Meanwhile, when the vehicle speed V is equal to or above the second speed V0, the ordinary control gains selected for the offset distance D and the yaw angle θ (S4).

Then, after determining the control gains through the above-described process, the target transverse acceleration is calculated using equations (1) to (3), and a control variable of the motor 16 for generating the target transverse acceleration is determined (S8). Then, the determined control variable of the motor 16 is output to the motor 16 (S9), and the driving assistance control is terminated.

Figure 6A:
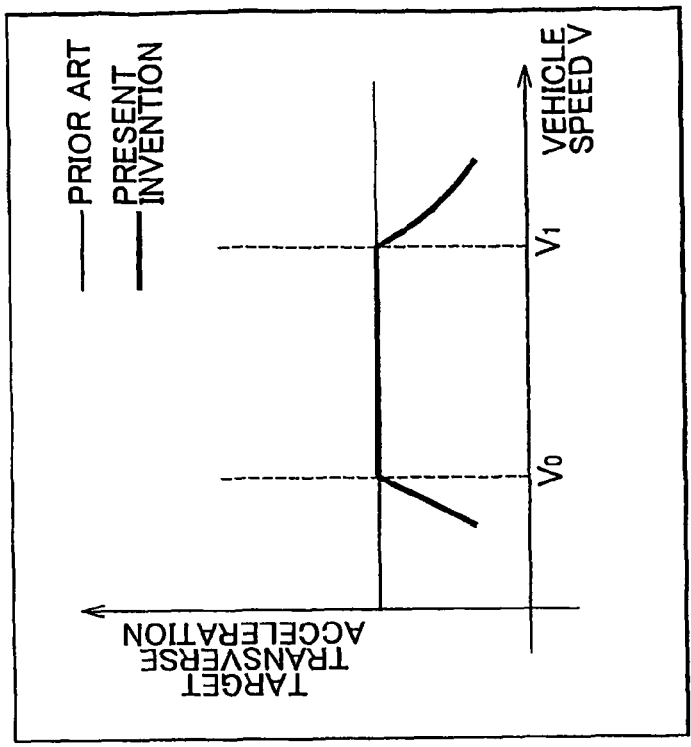
FIG. 6A is a graph showing a relationship between a vehicle speed and a target transverse acceleration directly calculated from an offset distance and FIG. 6B is a graph showing a relationship between a vehicle speed and a target transverse acceleration directly calculated from a yaw angle.
Figure 6B:
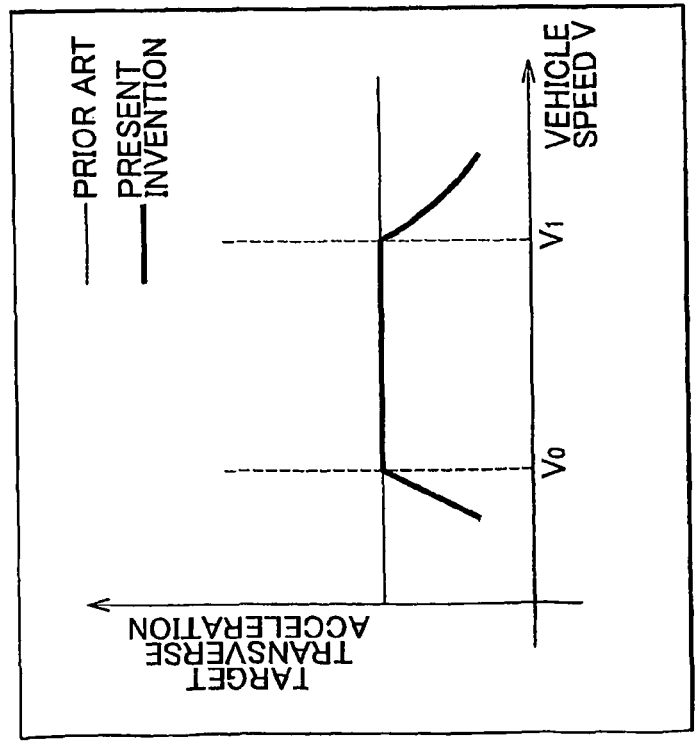

FIGS. 6A and 6B show the relationship between a target transverse acceleration and a vehicle speed. As can be seen from FIG. 6A, in a conventional control mechanism, the same target transverse acceleration is maintained constant regardless of the vehicle speed for a given offset distance. That is, the same target transverse acceleration is maintained even when the vehicle speed falls below the second speed V0 or increases above the first speed V1. In contrast, in accordance with the present invention, for a given offset distance the target transverse acceleration to compensate for the offset distance increases as the vehicle speed increases when the vehicle speed V is less than the second speed V0 and decreases as the vehicle speed increases when the vehicle speed V is equal to or greater than the first speed V1. As described above, by setting a control gain that decreases with the increase of the vehicle speed when the vehicle speed V is equal to or greater than the first speed V1, the reaction force of the steering torque can be reduced when the vehicle is running at a high speed, so that the discomfort of the driver can be reduced.

Further, as shown in FIG. 6B, in the conventional control mechanism, the same target transverse acceleration is maintained regardless of the vehicle speed for a given yaw angle. That is, the same target transverse acceleration to compensate for the yaw angle is maintained even when the vehicle speed falls below the second speed V0 or increases over the first speed V1. In contrast, in accordance with the present invention, for a given yaw angle the target transverse acceleration to compensate for the yaw angle increases with the increase of the vehicle speed V when the vehicle speed V is less than the second speed V0 decreases with the increase of the vehicle speed when the vehicle speed V is equal to or greater than the first speed V1. As described above, by setting a control gain that decreases with the increase of the vehicle speed V when the vehicle speed V is equal to or greater than the first speed V1, the reaction force of the steering torque can be reduced when the vehicle is running at a high speed. Thus, the discomfort of the driver feels can be reduced.

A second embodiment is similar to the first embodiment except that the target transverse acceleration is calculated by multiplying a target yaw rate by a vehicle speed. The target yaw rate is obtained by multiplying control gains by an offset distance and a yaw angle, respectively. In contrast, in the first embodiment the target transverse acceleration is calculated directly from the offset distance and the yaw angle.

In the lane keeping control mechanism in accordance with the second embodiment, a yaw rate $\omega r$ that allows the vehicle 1 to travel along the curve of a travel lane is calculated based on the curvature 1/R of the travel lane ahead of the vehicle 1 and the vehicle speed V. In addition, a yaw rate $\omega d$ required to make a current offset distance D be equal to a target offset distance D0 is calculated, where the current offset distance D represents the deviation of the vehicle 1 from the travel path of the vehicle 1. Likewise, a yaw rate $\omega \theta$ required to make a current yaw angle θ of the vehicle 1 be equal to a target yaw angle θ0 is also calculated. Then, a target yaw rate ω is obtained by adding the yaw rates $\omega r$, $\omega d$ and $\omega \theta$. By generating the target yaw rate ω of the vehicle 1, the vehicle 1 is allowed to travel along the curve of the forward lane, and the offset distance D can be corrected by adjusting the offset distance D and the yaw angle θ to the target offset distance D0 and the target yaw angle θ0, respectively.

Hereinafter, there will be described a method for calculating a target yaw rate from an offset distance and a yaw angle and then calculating a target transverse acceleration from the target yaw rate with reference to a block diagram provided in FIG. 7.

In this case, the offset distance and the yaw angle are first calculated. To calculate the offset distance and the yaw angle an image of the surrounding area ahead of the vehicle 1 is first captured by the CCD camera 8, and based on the image data, the curvature 1/R of the forward lane, the offset distance D and the yaw angle θ of the vehicle 1 are calculated by an image processing unit 9 or an ECU 2 as conditions of the forward travel path. Further, the curve curvature 1/R may be obtained by geometrically calculating the turning radius R of the forward lane and taking the reciprocal thereof. In a second embodiment, the ECU 2 serves as a target yaw rate determination unit.

A first operation unit 121 calculates the deviation of the current offset distance D of the vehicle 1 from the target offset distance D0 (which is equivalent to the offset distance D in this embodiment), while a second operation unit 122 calculates the deviation of the current yaw angle θ from the target yaw angle θ0 (which is equivalent to the yaw angle θ in this embodiment), wherein the target offset distance D0 and the target yaw angle θ0 are determined in advance and the current offset distance D and the current yaw angle θ are obtained from the image captured as described above.

Hereinbelow, the yaw rate $\omega d$ required to compensate for the offset distance D (i.e., to make the offset distance D approach the target value) will be described. The yaw rate ωd for compensating for the offset distance D is obtained by multiplying a gain coefficient by the offset distance deviation (D0−D) of the target offset distance D0 from the current offset distance D. Here, a first determination unit 123 determines whether or not the vehicle speed V is equal to or greater than a predetermined first speed V1, and if so (V1≦V), the multiplication is carried out in a first multiplication unit 125 by using a gain coefficient K33 for a given offset distance D, which decreases as the vehicle speed V increases. Here, the first speed V1 is set to a value within a range of, e.g., from about 120 to 150 km/h, a high-speed range within which the vehicle 1 is expected to be running on an expressway.

Meanwhile, if the vehicle speed V is below the first speed V1, a second determination unit 124 determines whether the vehicle speed V is equal to or above a preset second speed V0, which is lower than the first speed V1. If the vehicle speed V is equal to or above the second speed V0 (V0≦V<V1), the multiplication is carried out in a second multiplication unit 126 using a gain coefficient K32 to maintain a constant transverse acceleration. Further, if the vehicle speed V is below the second speed V0 (V<V0), the multiplication is done in a third multiplication unit 127 using a gain coefficient K31, which increases as the vehicle speed V increases for a given offset distance D. Here, the second speed V0 can be set to be as low as a lower speed limit on the expressway, i.e., to a value within a range from, e.g., about 50 to 80 km/h.

Next, there will be described the yaw rate ωθ required to compensate for the yaw angle θ (i.e., to make the yaw angle θ approach the target yaw angle θ0). A yaw rate ωθ that compensates for the yaw angle θ is obtained by multiplying a gain coefficient by the deviation (θ0−θ) of the current yaw angle θ from the target yaw angle θ0. Here, a third determination unit 128 determines whether or not the vehicle speed V is equal to or greater than the first speed V1; and if so (V1≦V), the multiplication is carried out in a fourth multiplication unit 130 by using a gain coefficient K43, which decreases as the vehicle speed increases for a given offset distance D. If the vehicle speed V is lower than the first speed V1, on the other hand, it is determined in a fourth determination unit 129 whether the vehicle speed V is equal to or above the second speed V0, which is lower than the first speed V1, and if so (V0≦V<V1), the multiplication is carried out in a fifth multiplication unit 131 by using a gain coefficient K42 for regulating the vehicle speed V constant. Further, if the vehicle speed V is less than the second speed V0 (V<V0), the multiplication is done in a sixth multiplication unit 132 using a gain coefficient K41, which increases as the vehicle speed V increases for a given offset distance D.

Further, the yaw rate ωr necessary to allow the vehicle 1 to travel along the curve of the forward lane is calculated based on the lane curvature 1/R described above. The lane curvature 1/R and the vehicle speed V detected by the vehicle speed sensors 11 are input to a feed forward controller 133, and a yaw rate ωr with respect to the lane curvature 1/R is calculated from the lane curvature 1/R and the vehicle speed V in accordance with predetermined characteristics. Then, by adding the three yaw rates obtained by means of an addition unit 134, a target yaw rate ω is obtained. The target yaw rate ω is converted into a target transverse acceleration in a target transverse acceleration calculation unit 135 by using the vehicle speed V detected by the vehicle speed sensors 11.

Here, when the vehicle speed V is below the second speed V0, the target yaw rate can be calculated from the following equation (4), and the target transverse acceleration can be calculated from the following equation (5).

$$\text{Target yaw rate} = K31 \times (\text{offset distance}) + K41 \times (\text{yaw angle}) + \omega r \quad (4)$$

where, K31 and K41 are coefficients which do not depend on the vehicle speed V.

$$\text{Target transverse acceleration} = (\text{Target yaw rate}) \times V \quad (5)$$

Further, when the vehicle speed V is at least the second speed V0 but lower than the first speed V1, the target yaw rate can be calculated using the following equation (6), and the target transverse acceleration can be calculated from the above equation (5):

$$\text{Target yaw rate} = K32 \times (\text{offset distance}) + K42 \times (\text{yaw angle}) + \omega r \quad (6)$$

where, $K32 = K31 \cdot V0/V$,
$K42 = K41 \cdot V0/V$.

Furthermore, when the vehicle speed V is at least the first speed V1, the target yaw rate can be calculated from the following equation (7), and the target transverse acceleration can be calculated from the above equation (5).

$$\text{Target yaw rate} = K33 \cdot (\text{offset distance}) + K43 \cdot (\text{yaw angle}) + \omega r \quad (7)$$

where, $K33 = K32 \cdot V1/V = K31 \cdot V0 \cdot V1/V^2$,
$K43 = K42 \cdot V1/V = K41 \cdot V0 \cdot V1/V^2$.

After a target transverse acceleration is obtained as described above, a torque operation unit 136 calculates the steering amount (the driving torque of the motor 16) required to generate the target transverse acceleration.

Then, an EPS 137, i.e., the motor 16 is driven to generate the driving torque, whereby the left and the right front wheel FL and FR are steered, so that the vehicle 1 turns to keep running along the lane. If the vehicle 1 turns, another image of the surrounding area ahead of the vehicle 1 is captured by the CCD camera 8, and the above-described lane keeping control is repeated.

Figure 8A:
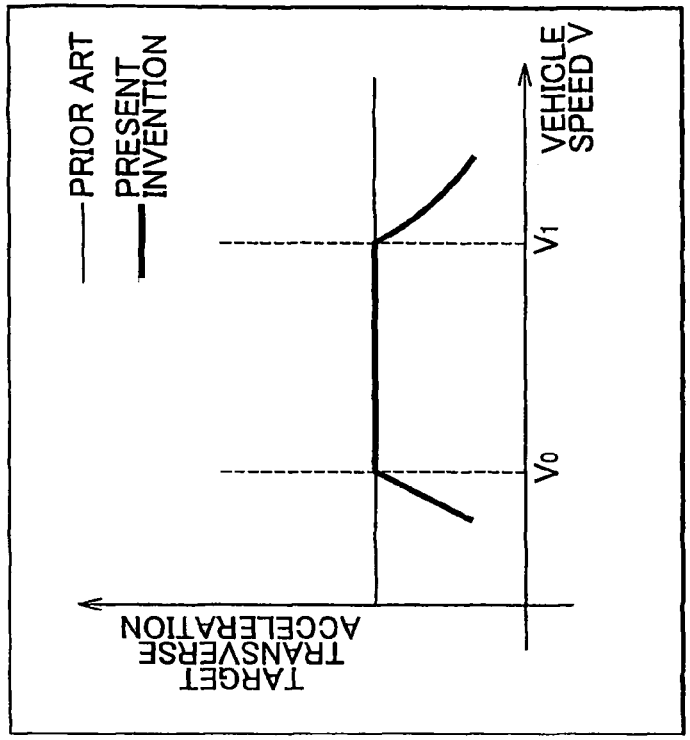
FIG. 8A depicts a graph showing a relationship between a vehicle speed and a target transverse acceleration calculated from a target yaw rate that is obtained from an offset distance and FIG. 8B presents a graph showing a relationship between a vehicle speed and a target transverse acceleration calculated from a target yaw rate that is obtained from a yaw angle.

The relationship between the target transverse acceleration obtained as described above and the vehicle speed is shown in FIGS. 8A and 8B. As can be seen from FIG. 8A, in a conventional control mechanism, the same target transverse acceleration is maintained constant regardless of the vehicle speed for a given offset distance. That is, the same target transverse acceleration is maintained even when the vehicle speed falls below the second speed V0 or increases over the first speed V1. In contrast, in accordance with the present invention, for a given offset distance, the target transverse acceleration to compensate for the offset increases with the increase of the vehicle speed when the vehicle speed V is less than the second speed V0, whereas the target transverse acceleration for the offset compensation decreases with the increase of the vehicle speed when the vehicle speed V is equal to or greater than the first speed V1. As described above, by setting control gains to decrease with the increase of the vehicle speed, the reaction force of the steering torque can be reduced when the vehicle is running at a high speed, so that the discomfort of the driver can be reduced.

Figure 8B:
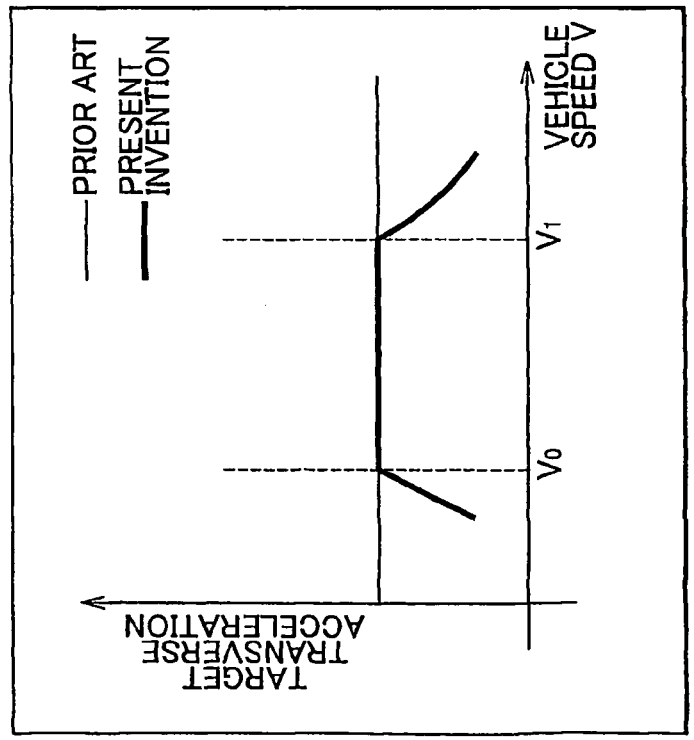

Further, as shown in FIG. 8B, in the conventional control mechanism, the same target transverse acceleration is maintained for a given yaw angle regardless of the vehicle speed. That is, the same target transverse acceleration to compensate for the yaw angle is maintained even when the vehicle speed falls below the second speed V0 or increases over the first speed V1. In contrast, in accordance with the present invention, for a given yaw angle, the target transverse acceleration that compensates for the yaw angle increases with the increase of the vehicle speed when the vehicle speed V is less than the second speed V0. In addition, the target transverse acceleration that compensates for the yaw angle decreases with the increase of the vehicle speed when the vehicle speed V is equal to or greater than the first speed V1. As described above, by setting the control gains to decrease with the increase of the vehicle speed, the reaction force of the steering torque can be reduced when the vehicle is running at a high speed, so that the discomfort of the driver can be reduced.

In addition, although the driving amount of the motor 16 is determined based on the target transverse acceleration in the second embodiment, it is also possible to decide the driving amount of the motor 16 based on the target yaw rate.

A third embodiment of the present invention is also similar to the first embodiment except that in calculating the target transverse acceleration directly from the target offset distance and the target yaw angle, the target transverse acceleration is obtained as a control variable for canceling a deviation of the position of the vehicle 1 from the forward travel path at a focus point distance in the third embodiment. In contrast, in the first embodiment the target transverse acceleration is calculated as a control variable for canceling an offset distance D, which is the displacement of the vehicle position from the forward travel path in a transverse direction of the vehicle.

In this case, if the vehicle speed V is less than the predetermined second speed V0 (V<V0), the target transverse acceleration can be calculated using equation (8) as follows.

$$\text{Target transverse acceleration} = K51 \cdot V \times \{(\text{offset distance}) + (\text{focus point distance}) \times (\text{yaw angle})\} \quad (8)$$

where, K51 is a coefficient which does not depend on the vehicle speed V.

Further, when the vehicle speed V is equal to or greater than the second speed V0 but lower than a predetermined first speed V1 (V0≦V<V1), the target transverse acceleration can be calculated using equation (9) as follows.

$$\text{Target transverse acceleration} = K52 \times \{(\text{offset distance}) + (\text{focus point distance}) \times (\text{yaw angle})\} \quad (9)$$

where, K52=V0·K51.

Moreover, when the vehicle speed V is equal to or greater than the first speed V1 (V1≦V), the target transverse acceleration is calculated using equation (10) as follows.

$$\text{Target transverse acceleration} = K53 \cdot (1/V) \times \{(\text{offset distance}) + (\text{focus point distance}) \times (\text{yaw angle})\} \quad (10)$$

where, K53=V0·V1·K51.

Figure 9A:
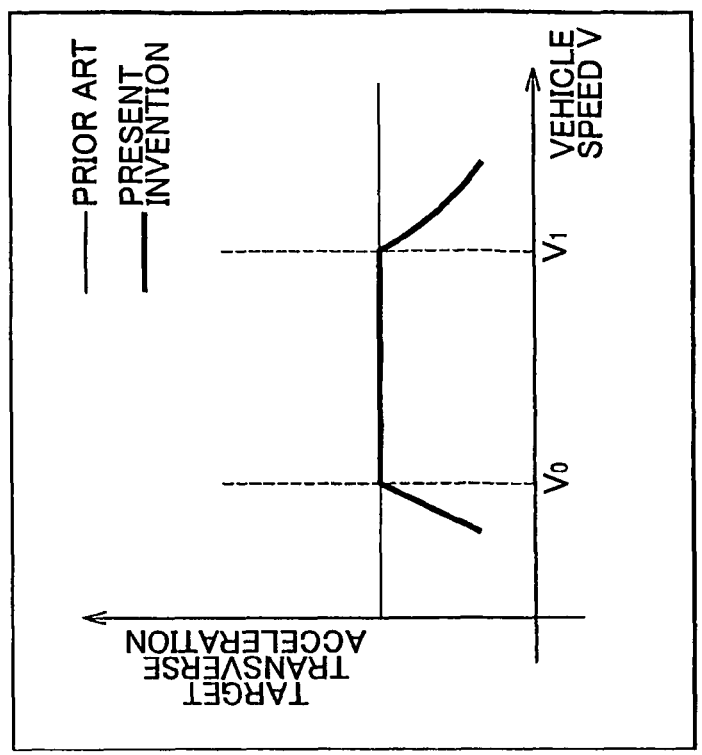
FIG. 9A sets forth a graph showing a relationship between a vehicle speed and a target transverse acceleration calculated from an offset distance and a yaw angle at a focal point distance and FIG. 9B provides a graph showing a relationship between a vehicle speed and a target transverse acceleration calculated from a target yaw rate which is obtained from an offset distance and a yaw angle at the focal point distance.

FIG. 9A depicts the relationship between the target transverse acceleration thus obtained and the vehicle speed. As shown in FIG. 9A, in a conventional control mechanism, the same target transverse acceleration is maintained regardless of the vehicle speed. In contrast, in accordance with the third embodiment of the invention, for a given the offset distance the target transverse acceleration decreases with increases in the vehicle speed when the vehicle speed V is equal to or greater than the first speed V1. As described above, by setting control gains to decrease as the vehicle speed increases, the reaction force of the steering torque can be reduced while the vehicle is running at a high speed, so that the discomfort of the driver can be reduced.

The fourth preferred embodiment of the present invention is similar to the second embodiment except that calculating the target transverse acceleration from a target yaw rate, obtained by multiplying control gains to an offset distance and a yaw angle, respectively, and taking the target yaw rate and the vehicle speed into consideration, the target transverse acceleration is obtained as a control variable for canceling a deviation of the vehicle position from a forward travel path at a focus point distance in the fourth embodiment, whereas the target transverse acceleration is calculated as a control variable for canceling an offset distance D, which is a displacement of a vehicle position from the forward travel path in a transversal direction thereof in the second embodiment. In this case, if a vehicle speed V is below the preset second speed V0 (V<V0), the target yaw rate is calculated using the following equation (11), and the target transverse acceleration is calculated using the above equation (5).

$$\text{Target yaw rate} = K61 \times \{(\text{offset distance}) + (\text{focus point distance}) \times (\text{yaw angle})\} + \omega r \quad (11)$$

where, K61 is a coefficient which does not depend on the vehicle speed V.

Further, when the vehicle speed V is at or above a second speed V0 but lower than a first speed V1 (V0≦V<V1), the target yaw rate and the target transverse acceleration can be calculated from the following equation (12), and the target transverse acceleration is calculated using the above equation (5).

$$\text{Target yaw rate} = \text{Target transverse acceleration} = K62 \cdot (1/V) \times \{(\text{offset distance}) + (\text{focus point distance}) \times (\text{yaw angle})\} + \omega r \quad (12)$$

where, K62=V0·K61.

Moreover, when the vehicle speed V is equal to or greater than the first speed V1 (V1≦V), the target yaw rate can be calculated using the following equation (13) and the target transverse acceleration can be calculated from the above equation (5).

$$\text{Target yaw rate} = K63 \cdot (1/V^2) \times \{(\text{offset distance}) + (\text{focus point distance}) \times (\text{yaw angle})\} + \omega r \quad (13)$$

where, K63=V0·V1·K61.

Figure 9B:
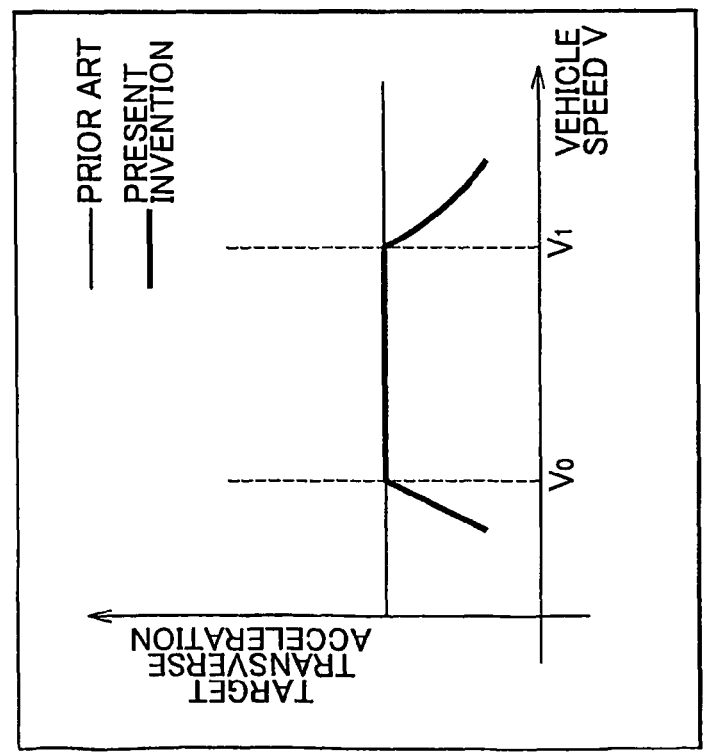

FIG. 9B depicts the relationship between the target transverse acceleration thus obtained and the vehicle speed. As shown in FIG. 9B, in a conventional control mechanism, the same target transverse acceleration is maintained regardless of the vehicle speed. In contrast, in accordance with the fourth embodiment of the present invention, for a given offset distance the target transverse acceleration decreases as the vehicle speed increases when the vehicle speed V is equal to or greater than the first speed V1. As described above, by setting the control gain to decrease with increases the vehicle speed, the reaction force of the steering torque is reduced when the vehicle is running at a high speed, so that the discomfort of the driver can be reduced.

Although the preferred embodiments of the present invention have been described above, the present invention is not limited thereto. For example, though the target yaw rate and the target transverse acceleration compensate for both the offset distance D and the yaw angle θ in the above preferred embodiments of the present invention, the target yaw rate and the target transverse acceleration may be used to compensate or either the offset distance D and the yaw angle θ alone. Moreover, though same reference vehicle speeds (the first and the second vehicle speed) are applied for the compensation of both the offset distance D and the yaw angle θ, different reference speeds can be employed for them, respectively. Furthermore, although the steering torque of the motor for steering the steered wheels is controlled as a control variable for steering the vehicle in the above-described preferred embodiments, alternative control variables, such as, for example, the steering angle of the steered wheels may be used instead. In addition, although a CCD camera is employed as the road information acquiring unit in the above-descried preferred embodiments, alternative devices, such as a high-density GPS or a vehicle information and communication system (VICS), which are capable of calculating the deviation of a vehicle from the travel path thereof, may be used instead.

While the invention has been shown and described with respect to the preferred embodiments, it will be understood by those skilled in the art that various changes and modifications may be made without departing from the spirit and scope of the invention as defined in the following claims.

The invention claimed is:

1. A driving assistance system that includes an actuator for steering steered wheels of a vehicle, comprising:
    a vehicle speed detecting unit that detects a speed of the vehicle;
    an information acquiring unit that acquires information about the environment around the vehicle;
    a positional deviation detecting unit that detects a deviation of a position of the vehicle from a forward travel path of the vehicle based on the information acquired by the information acquiring unit, wherein the deviation of the position of the vehicle from the forward travel path is at least one of a transverse positional displacement of the vehicle and an angular displacement of the vehicle with respect to the forward travel path;
    a steering control variable determination unit that determines a steering control variable to correct the deviation of the position of the vehicle from the forward travel path of the vehicle, wherein the steering control variable determination unit includes a target transverse acceleration determination unit for calculating a target transverse acceleration of the vehicle that corrects the detected deviation of the position of the vehicle from the forward travel path, and the steering control variable determination unit determines the steering control variable based on the target transverse acceleration calculated; and
    a steering control unit for controlling the actuator based on the steering control variable,
    wherein, if the vehicle speed detected by the vehicle speed detecting unit is equal to or greater than a first predetermined speed, the steering control variable for the detected deviation of the position of the vehicle from the forward travel path decreases with increasing vehicle speed.

2. The driving assistance system according to claim 1, wherein the steering control variable is a control variable for a steering torque applied to the steered wheels by the actuator.

3. The driving assistance system according to claim 1, wherein the target transverse acceleration is obtained by adding up:
    a transverse acceleration required to correct a transverse positional displacement of the vehicle with respect to the forward travel path; and
    a transverse acceleration required to correct an angular displacement of the vehicle with respect to the forward travel path.

4. The driving assistance system according to claim 1, wherein the deviation of the position of the vehicle from the forward travel path is a transverse positional displacement of the vehicle with respect to the forward travel path.

5. The driving assistance system according to claim 1, wherein the deviation of the position of the vehicle from the forward travel path is an angular displacement of the vehicle with respect to the forward travel path.

6. The driving assistance system according to claim 1, wherein, if the vehicle speed detected by the vehicle speed detecting unit is below a second predetermined speed which is lower than the first predetermined speed, the steering control variable for the detected deviation of the position of the vehicle from the forward travel path increases with increasing vehicle speed.

7. The driving assistance system according to claim 6, wherein, if the vehicle speed detected by the vehicle speed detecting unit is below the first predetermined speed and equal to or greater than the second predetermined speed, the steering control variable for the detected deviation of the position of the vehicle from the forward travel path is kept constant.

8. The driving assistance system according to claim 1, wherein the deviation of the position of the vehicle from the forward travel path is a deviation at a focus point distance position.

9. The driving assistance system according to claim 1, wherein the steering control variable determination unit determines the steering control variable based on a value obtained by multiplying the deviation of the position of the vehicle from the forward travel path by a control gain, wherein if the vehicle speed detected by the vehicle speed detecting unit is equal to or greater than the first predetermined speed, the control gain for the detected deviation of the position of the vehicle from the forward travel path decreases with increasing vehicle speed.

10. The driving assistance system according to claim 9, wherein, if the vehicle speed detected by the vehicle speed detecting unit is below a second predetermined speed which is lower than the first predetermined speed, the control gain for the detected deviation of the position of the vehicle from the forward travel path increases with increasing vehicle speed.

11. The driving assistance system according to claim 9, wherein, if the vehicle speed detected by the vehicle speed detecting unit is below the first predetermined speed and equal to or greater than a second predetermined speed which is lower than the first predetermined speed, the control gain is determined so that the steering control variable for the detected deviation of the position of the vehicle from the forward travel path is kept constant.

12. The driving assistance system according to claim 1, wherein the steering control variable determination unit includes a target yaw rate determination unit that calculates a target yaw rate of the vehicle to correct the deviation of the position of the vehicle from the forward travel path, and the steering control variable determination unit determines the steering control variable based on the target yaw rate calculated.

13. The driving assistance system according to claim 12, wherein the steering control variable is determined in accordance with the target transverse acceleration obtained by multiplying the target yaw rate and the vehicle speed.

14. The driving assistance system according to claim 12, wherein the target yaw rate is obtained by adding up:
    a yaw rate that allows the vehicle to travel along the curve of a travel lane;
    a yaw rate required to correct a transverse positional displacement of the vehicle with respect to the forward travel path; and
    a yaw rate required to correct an angular displacement of the vehicle with respect to the forward travel path.

15. A driving assistance method that assists a steering operation of a vehicle by controlling an actuator for steering steered wheels of the vehicle, comprising:
    detecting a speed of the vehicle;
    acquiring information about the environment around the vehicle;

detecting a deviation of a position of the vehicle from a forward travel path of the vehicle based on the information, wherein the deviation of the position of the vehicle from the forward travel path is at least one of a transverse positional displacement of the vehicle and an angular displacement of the vehicle with respect to the forward travel path;

determining a steering control variable to correct the deviation of the position of the vehicle from the forward travel path of the vehicle, wherein determining the steering control variable includes calculating a target transverse acceleration of the vehicle that corrects the detected deviation of the position of the vehicle from the forward travel path, and determining the steering control variable based on the target transverse acceleration calculated; and controlling the actuator based on the steering control variable, wherein, if the vehicle speed is equal to or greater than a first predetermined speed, the steering control variable for the detected deviation of the position of the vehicle from the forward travel path decreases with increasing vehicle speed.

* * * * *